United States Patent
Shin

(10) Patent No.: US 8,402,057 B2
(45) Date of Patent: Mar. 19, 2013

(54) CONTENT MANAGEMENT METHOD AND APPARATUS USING LICENSE INFORMATION

(75) Inventor: Sung-chol Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 11/594,218

(22) Filed: Nov. 8, 2006

(65) Prior Publication Data
US 2007/0219920 A1  Sep. 20, 2007

(30) Foreign Application Priority Data

Mar. 14, 2006  (KR) .................. 10-2006-0023570

(51) Int. Cl.
*G06F 17/30* (2006.01)
(52) U.S. Cl. ...................... 707/783; 707/913
(58) Field of Classification Search .......... 707/1, 9, 707/783, 913
See application file for complete search history.

(56) References Cited

U.S. PATENT DOCUMENTS

| | | | | |
|---|---|---|---|---|
| 5,537,585 | A * | 7/1996 | Blickenstaff et al. ................. | 1/1 |
| 6,023,709 | A * | 2/2000 | Anglin et al. .......................... | 1/1 |
| 6,330,572 | B1 * | 12/2001 | Sitka ............................. | 707/608 |
| 6,981,217 | B1 * | 12/2005 | Knauft et al. ................. | 715/210 |
| 7,747,532 | B2 * | 6/2010 | Wakimoto ...................... | 705/59 |
| 7,827,613 | B2 * | 11/2010 | Koved et al. ..................... | 726/26 |
| 7,996,538 | B2 * | 8/2011 | Kikkawa et al. .............. | 709/227 |
| 2003/0236886 | A1 * | 12/2003 | Oren et al. .................... | 709/225 |
| 2004/0054779 | A1 * | 3/2004 | Takeshima et al. ........... | 709/225 |
| 2005/0091216 | A1 * | 4/2005 | Kranz et al. .................... | 707/10 |
| 2005/0234864 | A1 * | 10/2005 | Shapiro ............................. | 707/1 |
| 2006/0129537 | A1 * | 6/2006 | Torii et al. .......................... | 707/3 |
| 2006/0212481 | A1 * | 9/2006 | Stacey et al. ............... | 707/104.1 |

FOREIGN PATENT DOCUMENTS

| KR | 10-2005-0034508 A | 4/2005 |
|---|---|---|
| KR | 10-2005-0102522 A | 10/2005 |

OTHER PUBLICATIONS mrbiiggy et al., "Work with the Safari 1.2 Downloads Window" Feb. 9, 2004, www.hints.macworld.com <http://hints.macworld.com/article.php?story=20040203153501975>, p. 1-5.*
sjk, et al., "Download BlueHarvest for Mac" Dec. 21, 2005, www.macupdate.com <http://www.macupdate.com/app/mac/20036/blueharvest>, p. 1-8.*
The Omni Group, "OmniWeb Release Notes" Mar. 13, 2006, Omnigroup Forums via Wayback Machine <http://web.archive.org/web/20060313060536/http://www.omnigroup.com/applications/omniweb/releasenotes/>, p. 1-33.*
Noworryz, "Explaining the Finder's view options and toolbar visibility" Mar. 7, 2003, MacOSXHints.com <http://hints.macworld.com/article.php?story=20030305025744788>, p. 1-13.*
The Omni Group, "URL of downloaded file in Spotlight comments?" May 2006, Omnigroup Forumns <http://forums.omnigroup.com/showthread.php?t=314> p. 1-4.*
Noworryz, "Explaining the Finders view options and toolbar visibility" Mar. 7, 2003, <http://hints.macworld.com/article.php?story=20030305025744788> MacOSXHints.com, p. 1-9.*

* cited by examiner

*Primary Examiner* — Jorge A Casanova
(74) *Attorney, Agent, or Firm* — Sughrue Mion, PLLC

(57) ABSTRACT

A content management method and apparatus for storing and deleting content, backing up content, and restoring the backup content are provided. The method includes receiving the content from a first server and storing the content, and generating and storing content information including information about a location from which the content can be downloaded.

7 Claims, 10 Drawing Sheets

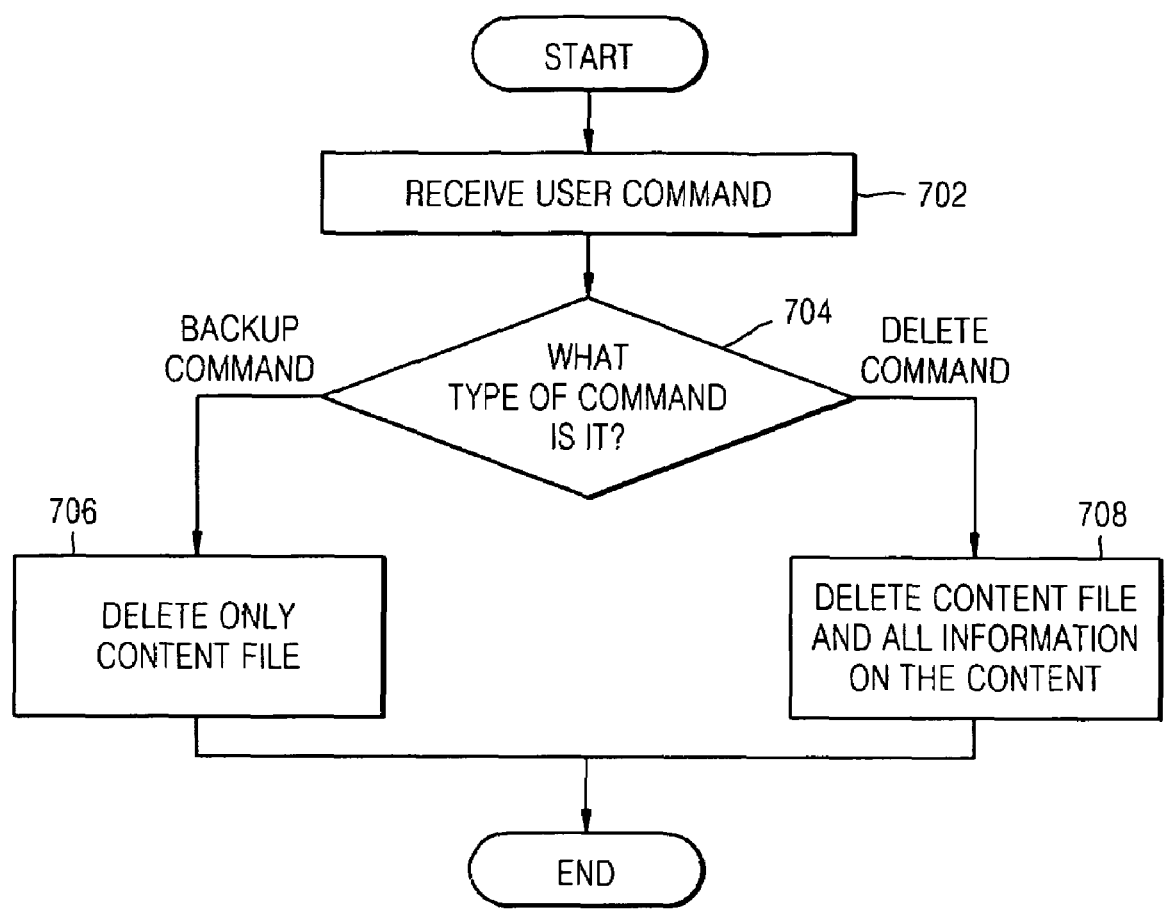

FIG. 8A

CONTENT LIST
1. DAEJANGKEUM #1
2. DAEJANGKEUM #2
3. DAEJANGKEUM #3
4. FRIENDS #1-1
5. FRIENDS #1-2
⋮

FIG. 8B

BACKUP LIST
1. DAEJANGKEUM #10
2. DAEJANGKEUM #20
3. DAEJANGKEUM #30
4. FRIENDS #1-10
5. FRIENDS #1-20
⋮

FIG. 8C

CONTENT LIST

1. DAEJANGKEUM #1
2. DAEJANGKEUM #2
3. DAEJANGKEUM #3        810
4. DAEJANGKEUM #10 (BACKUP)
5. DAEJANGKEUM #20 (BACKUP)
6. DAEJANGKEUM #30 (BACKUP)
7. FRIENDS #1-1
8. FRIENDS #1-2
9. FRIENDS #1-10 (BACKUP)
10. FRIENDS #1-20 (BACKUP)

CONTENT MANAGEMENT METHOD AND APPARATUS USING LICENSE INFORMATION

CROSS-REFERENCE TO RELATED PATENT APPLICATIONS

This application claims priority from Korean Patent Application No. 10-2006-0023570, filed on Mar. 14, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to managing contents stored in a storage device, and more particularly, to a content management method and apparatus for storing and deleting content, backing up content, and restoring the backup content.

2. Description of the Related Art

In the related art, problems exist with managing large amounts of information. In particular, related art audio/video (AV) files accumulate in a storage, and a user may delete unnecessary files or back up files. Usually, when a file is deleted, information on the file is deleted with the intention of not using the file after deletion. When a file is backed up, the file is stored so that it may be recovered in order to use the file again.

In the related art, when a user backs up a file, the file is stored in a separate storage medium such as an optical medium, is compressed before being stored, or an image file of the file is generated and stored. When this happens, since space in a separate storage medium or part of an original storage medium is occupied, there still exists a related art difficulty in managing storage space.

SUMMARY OF THE INVENTION

The present invention provides a content management method and apparatus for efficiently using storage space by backing up content, based on an external storage medium or storage space in an external server being usable through a network and content being downloadable repeatedly in a two-way network environment.

The present invention also provides a convenient user interface for content management.

According to an aspect of the present invention, there is provided a method of managing content. The method includes receiving the content from a first server and storing the content, and generating and storing content information including information about a location from which the content can be downloaded.

The location information may include uniform resource locator (URL) information of the first server or URL information of a second server providing the content.

The method may further include receiving from the first server, license information for controlling a license to use the content and storing the license information.

The generating and storing of the content information may include recording the content information in a file in which the license information is stored.

According to another aspect of the present invention, there is provided a method of managing content stored in a storage unit together with information about a location from which the content can be downloaded. The method includes receiving a backup command and deleting a file storing the content without deleting a file storing the location information.

The method may further include receiving a restore command to restore the backed-up content, generating content request information based on the location information and transmitting the content request information to a server providing the content, and receiving the content from the server.

The method may further include determining whether the restore command has a right to restore the content based on license information of the content, in response to the restore command; and when it is determined that the restore command has the right, transmitting the content request information to the server.

The method may further include receiving a delete command and deleting both the file storing the content and the file storing the location information.

The method may further include receiving a command to provide a content list, acquiring a list of contents stored in the storage unit; acquiring a list of backup contents which are not stored in the storage unit and of which location information only is stored; and displaying the content list and the backup content list distinctively from each other on one screen.

According to still another aspect of the present invention, there is provided an apparatus for managing content. The apparatus includes a transceiver transmitting information to and receiving information from a server; a content information generator generating content information including information about a location, from which the content can be downloaded, based on content received from the server; and a file manager transmitting content request information to the server through the transceiver, receiving the content from the server, and storing the content and the content information in a storage unit.

According to yet another aspect of the present invention, there is provided an apparatus for managing content. The apparatus includes a storage unit storing content and information about a location from which the content can be downloaded, and a file manager deleting the content from the storage unit when receiving a command to perform backup of the content from a user input unit and deleting the content and the location information from the storage unit when receiving a command to delete the content from the user input unit.

The apparatus may further include a transceiver transmitting information to and receiving information from a server. When the file manager receives a command to restore backup content from the user input unit, the file manager extracts location information corresponding to the backup content from the storage unit, transmits backup content request information to a server corresponding to the location information through the transceiver, receives corresponding content from the server, and stores the received content in the storage unit.

According to a further aspect of the present invention, there is provided a method of providing a content list. The method includes receiving a request for a list of contents stored in a storage medium from a user, providing the list of contents, and displaying the list of contents stored in the storage medium and a list of contents backed up in the storage medium distinctively from each other.

According to another aspect of the present invention, there is provided a method of requesting backup content. The method includes receiving a request for at least one backup content; extracting information on a method of using content from a license information file of the requested backup content; comparing the method with the request; determining whether to accept the request according to a result of the comparison; when it is determined to accept the request, reading information about the location of the content; and transmitting content request information to a location corresponding to the location information.

According to still another aspect of the present invention, there is provided a method of using backup content. The method includes receiving a request for content, reading information about the location of the requested content, transmitting content request information to a location corresponding to the location information, and receiving the content from a server corresponding to the location.

BRIEF DESCRIPTION OF THE DRAWINGS

The above and other aspects of the present invention will become more apparent by describing in detail exemplary embodiments thereof with reference to the attached drawings in which:

FIG. 7 is a flowchart of a method of deleting and backing up content according to an exemplary embodiment of the present invention;

FIGS. 8A and 8B illustrate user interfaces for providing a content list according to an exemplary embodiment of the present invention;

FIG. 8C illustrates a user interface for providing a content list according to another exemplary embodiment of the present invention.

DETAILED DESCRIPTION OF THE EXEMPLARY EMBODIMENTS

Hereinafter, exemplary embodiments of the present invention will be described in detail with reference to the attached drawings in which like numerals denote like elements.

Figure 1A:
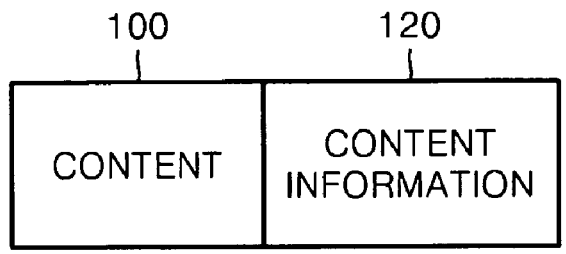
FIG. 1A illustrates a content structure according to an exemplary embodiment of the present invention.

FIG. 1A illustrates a content structure according to an exemplary embodiment of the present invention. A content file 100 and a content information file 120 including content information are stored. The content information file 120 includes content location information, i.e., information about a location from which content can be downloaded. The content can be accessed repeatedly using the content location information after the content is downloaded for the first time.

For example but not by way of limitation, the location information may be information about a location of a server from which the content has been received, a uniform resource locator (URL) of the server, or information on a location of another server providing the content. Also, the content information file 120 may include additional information such as the name or size of the content.

Figure 1B:
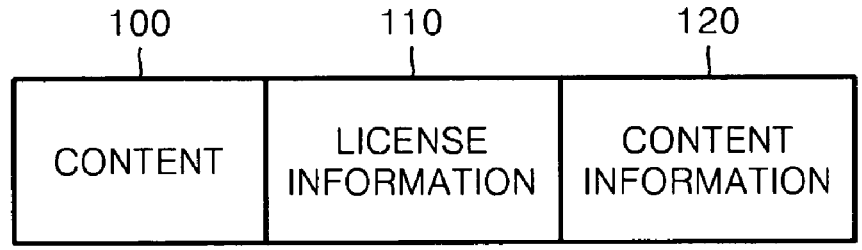
FIG. 1B illustrates a content structure according to another exemplary embodiment of the present invention.

FIG. 1B illustrates a content structure according to another exemplary embodiment of the present invention. The content structure includes a license information file 110 in addition to the content file 100 and the content information file 120. The license information file 110 includes information for controlling a license to use content. More specifically, the license information file 110 includes use information regarding how the content file 100 should be used, conditions for controlling the content file 100 to be used according to the use information, and information for decoding the content.

Figure 1C:
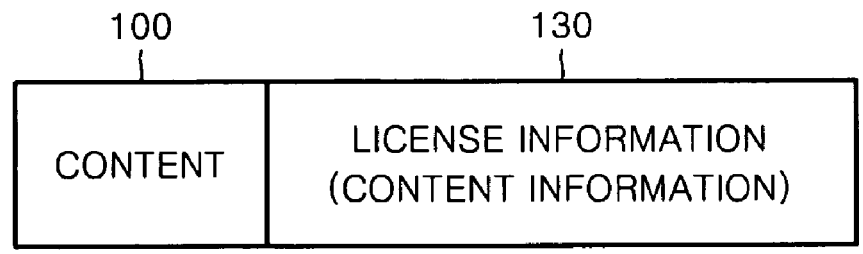
FIG. 1C illustrates a content structure according to another exemplary embodiment of the present invention.

FIG. 1C illustrates a content structure according to another exemplary embodiment of the present invention. Content information is included in a license information file 130. Since a license file can be composed in structured language such as extensible markup language (XML), it may (but need not) be easy to insert the content information into the license file.

Figure 2:
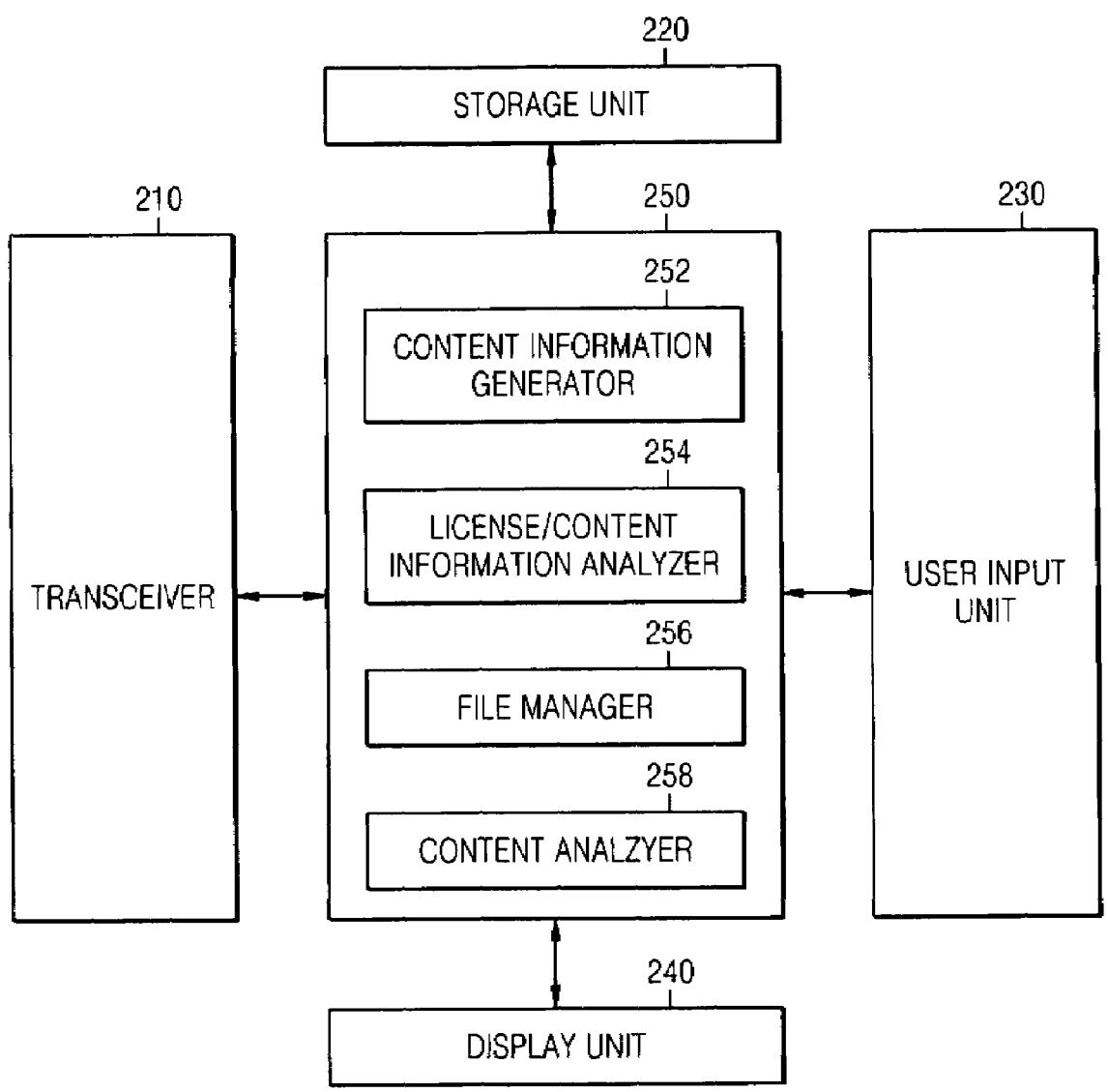
FIG. 2 is a block diagram of a content management apparatus according to an exemplary embodiment of the present invention.

FIG. 2 is a block diagram of a content management apparatus according to an exemplary embodiment of the present invention. The content management apparatus includes a transceiver 210 transmitting information to and receiving information from an external server, a storage unit (also structurally referred to as a storage device) 220, a user input unit 230 receiving a user command, a display unit 240 displaying a user interface screen and reproduced content, and a control unit 250 controlling each element in the apparatus and performing content management.

The control unit 250 includes a content information generator 252 generating content information referring to content received from a server and a file manager 256 controlling the storing, deletion, backup and recovery of content and the provision of a content list. The control unit 250 may further include a license/content information analyzer 254. When the content management apparatus is used for reproducing content, the content management apparatus may further include a content analyzer 258.

The transceiver 210 transmits a content request message to an external server or a broadcasting station, which stores content, and receives content from the external server or the broadcasting station. The transceiver 210 may be implemented by Ethernet or modem. Alternatively, the transceiver 210 may be a wireless network or an AV network, but is not limited thereto, and may be any transceiver as would be understood by one skilled in the art.

The storage unit 220 stores content, license information of the content, and content information. When the content is deleted, all of the content, the license information of the content, and the content information are deleted. When the content is backed up, only the content is deleted and the license information of the content and the content information are not deleted. In this case, if the license information and the content information exist in one license information file, only the license information file is stored after a backup operation. The storage unit 220 may be implemented by any kind of storage device such as a hard disk, flash memory or an optical storage medium like a digital versatile disc (DVD).

When the content management apparatus receives and stores content, the content information generator 252 generates a content information file including information about the location of a server from which the content is received. The content information file may also include information such as the name or size of the content as well as the location information. In addition, the content information file may further include a thumbnail representing the content. Such content information may be generated, stored, and managed like normal meta data, and may be expressed in a structured language such as extensible markup language (XML).

In addition, such information may be included in a license information file of the content. Usually, the license information file must be compatible with other systems, and therefore, it is often not appropriate to change the license information file. However, if only the compatibility is ensured, the content information can be inserted into the license information file and can be managed more conveniently. If the content information is included in the license information file received from a server, the content information generator 252 is not necessary.

The user input unit 230 receives and analyzes a user's input. The user input unit 230 may be a remote control signal input unit in a television receiver and may be any other kind of input unit. A user can input a command for requesting the download (or storing), deletion, or backup of content or the provision of a content list through the user input unit 230.

The license/content information analyzer 254 analyzes license information of content, and determines whether to permit a content access corresponding to a command received through the user input unit 230. In addition, the license/content information analyzer 254 analyzes content information and extracts location information. More specifically, when a user's request or a content access request is received, the license/content information analyzer 254 determines whether to accept the request based on the license information. The license information is defined by a method of using the content or conditions of the method and may be composed in a structured language such as XML. In this exemplary embodiment, a separate content information file or the content information included in a license information file is analyzed using the license/content information analyzer 254. The content information includes information such as the content's name or size and in particular, includes information on a location of a server that will transmit the content.

The content analyzer 258 is a video and audio decoder such as a Moving Picture Experts Group (MPEG) decoder. Since content is usually compressed, a decoder is needed to decompress and reproduce the content.

When a Save command to store content is received from the user input unit 230, the file manager 256 transmits content request information to a server through the transceiver 210 and receives the content from the server. In addition, the file manager 256 stores in the storage unit 220 the received content and content information referring to the content that is generated by the content information generator 252.

When a Backup command to back up content is received from the user input unit 230, the file manager 256 deletes the content from the storage unit 220. In this case, location information and content information are not deleted.

When a Delete command to delete content is received from the user input unit 230, the file manager 256 deletes all of the content, content information, and license information from the storage unit 220.

When a Restore command to restore backup content is received from the user input unit 230, the file manager 256 transmits backup content request information to a server providing the backup content, with reference to location information stored in the storage unit 220. In addition, the file manager 256 receives the backup content and stores it in the storage unit 220.

When a command to instruct that a content list be provided is received from the user input unit 230, the file manager 256 obtains a list of contents stored in the storage unit 220 and a list of backup contents, with respect to which corresponding content is not stored in the storage unit 220 but only location information is stored in the storage unit 220, and displays the content list and the backup content list. Here, the content list and the backup content list may be displayed on one screen distinctively from each other. The file manager 256 provides these content lists so that a user can easily and conveniently navigate contents stored in the storage unit 220. Usually, content related information such as a title of the content is read from meta data included in content and edited to be easily recognized by a user. In this exemplary embodiment, content stored in the storage unit 220 is distinguished from backup content when a list is provided. In particular, a method of distinctively displaying a content list and a backup content list may be useful in a consumer electronics (CE) apparatus such as a digital television, since the user interface can be relatively simple.

Figure 3:
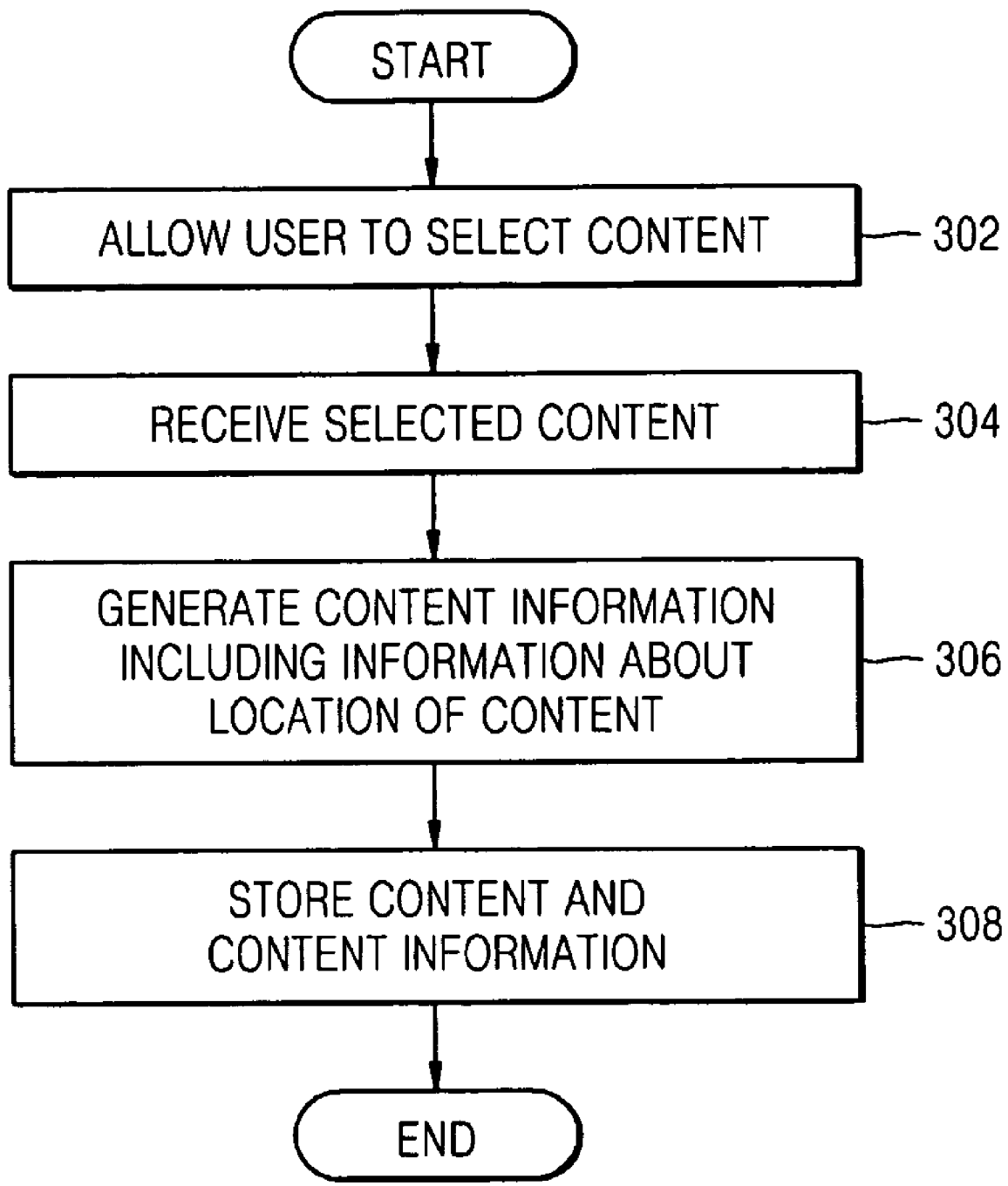
FIG. 3 is a flowchart of a content management method according to an exemplary embodiment of the present invention.

FIG. 3 is a flowchart of a content management method according to an exemplary embodiment of the present invention. In operation 302, a user selects content to be stored using the user input unit 230. In operation 304, the content is received from a server. In operation 306, content information including information on a location from which the content can be downloaded is generated. In operation 308, the received content and the generated content information are separately stored in the storage unit 220.

The exemplary embodiment is characterized by storing information about the location of a server that can transmit content together with the content information. The location information includes information about a location of the server, which can be accessed and from which the content can be downloaded. For example, but not by way of limitation, the location information may be a URL. When content A is downloaded from a first server, the location information may be information about a location of the content A within the first server. In other cases, the location information may be information about a location of another server storing the content A.

Figure 4:
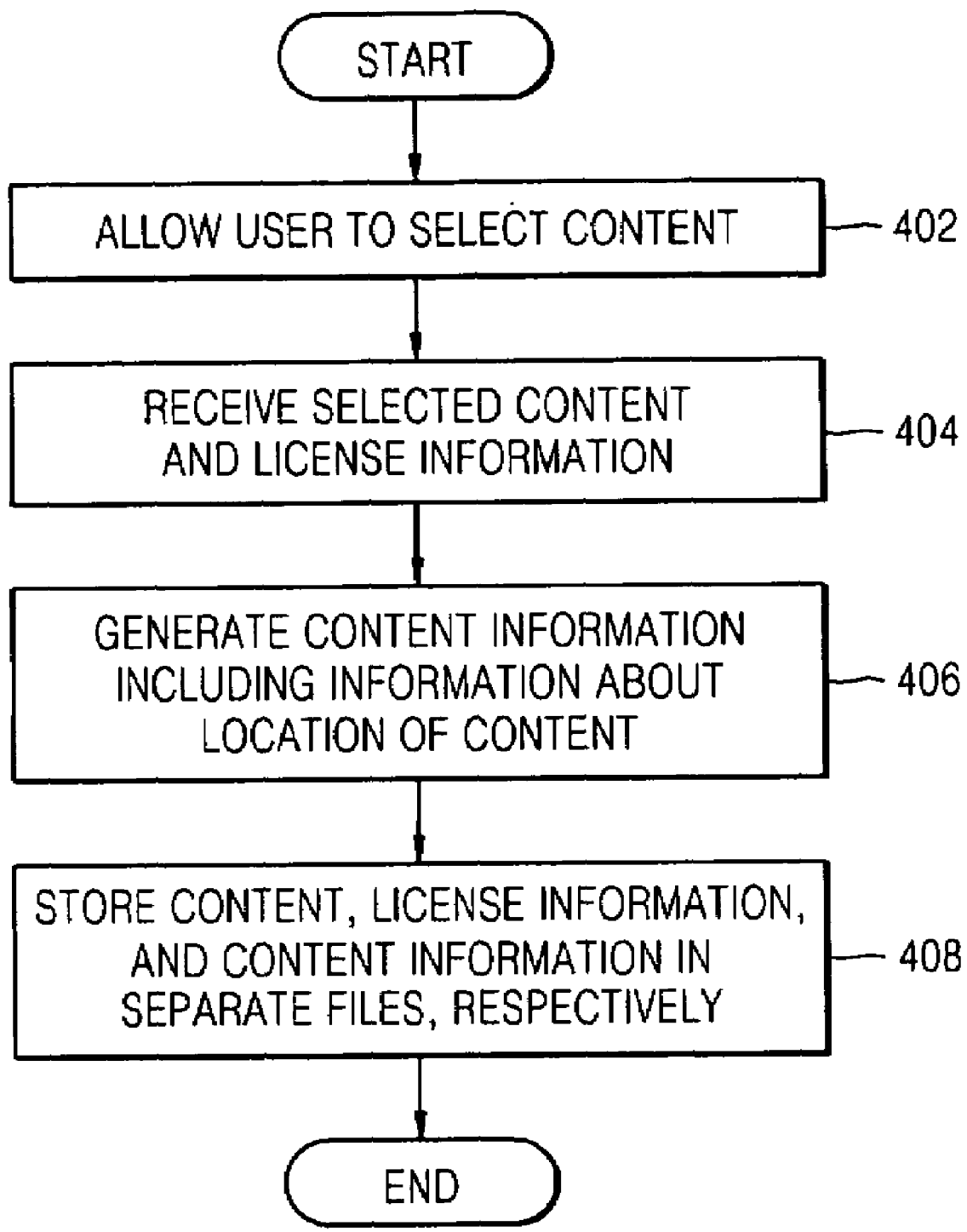
FIG. 4 is a flowchart of a content management method according to another exemplary embodiment of the present invention.

FIG. 4 is a flowchart of a content management method according to another exemplary embodiment of the present invention. In operation 402, a user selects content to be stored using the user input unit 230. In operation 404, the content and license information are received from a server. In operation 406, content information including information on a location from which the content can be downloaded is generated. In operation 408, the received content, the received license information, and the generated content information are respectively stored in separate files in the storage unit 220. The content information file and the license information file may be composed using a structured language such as XML, but may also be composed using byte codes or the like.

Figure 5:
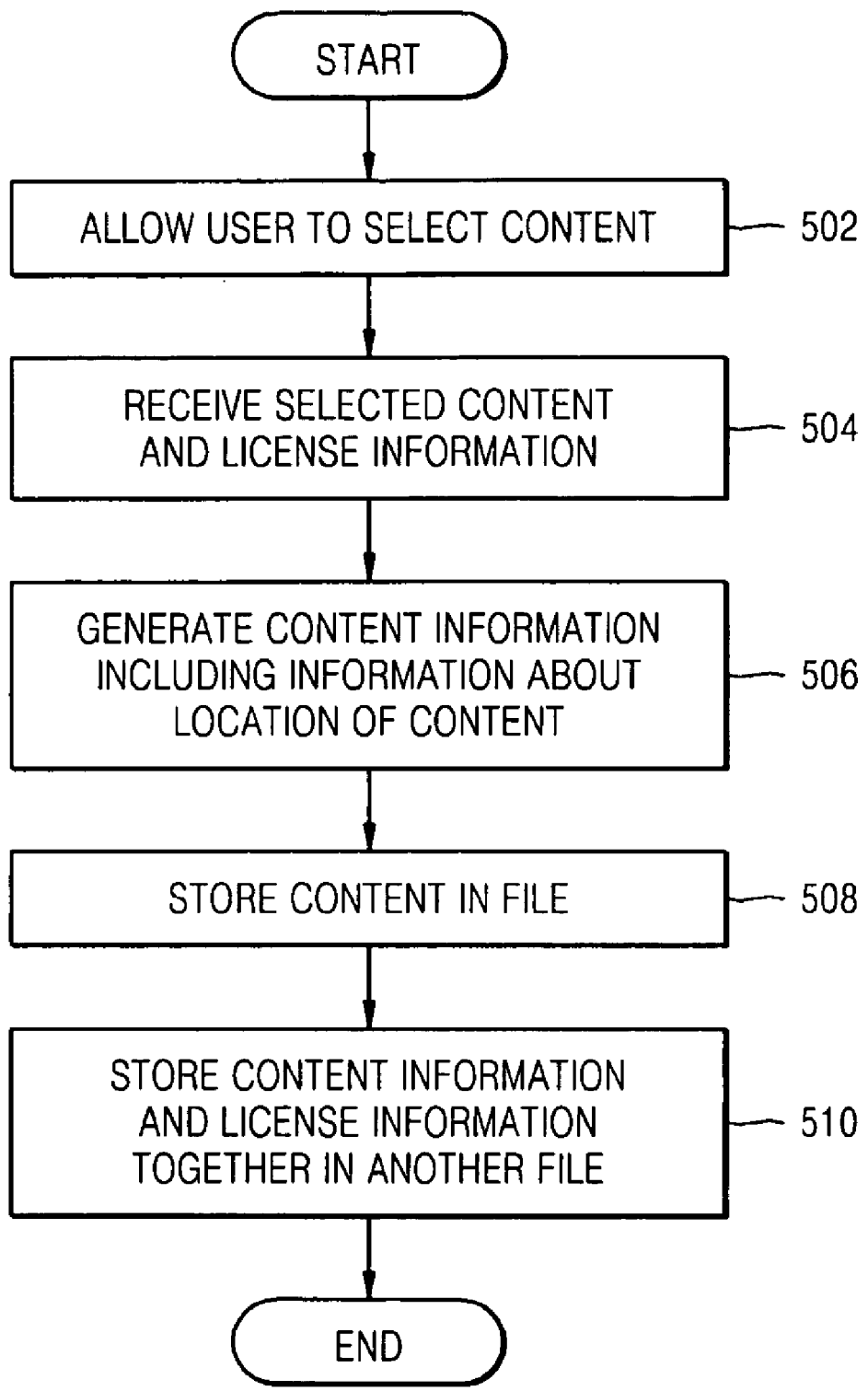
FIG. 5 is a flowchart of a content management method according to another exemplary embodiment of the present invention.

FIG. 5 is a flowchart of a content management method according to another exemplary embodiment of the present invention. In operation 502, a user selects content to be stored using the user input unit 230. In operation 504, the content and license information are received from a server. In operation 506, content information including information on a location from which the content can be downloaded is generated. In operation 508, the content is stored in a content file. In operation 510, the generated content information and the received license information are stored together in a license information file.

Figure 6:
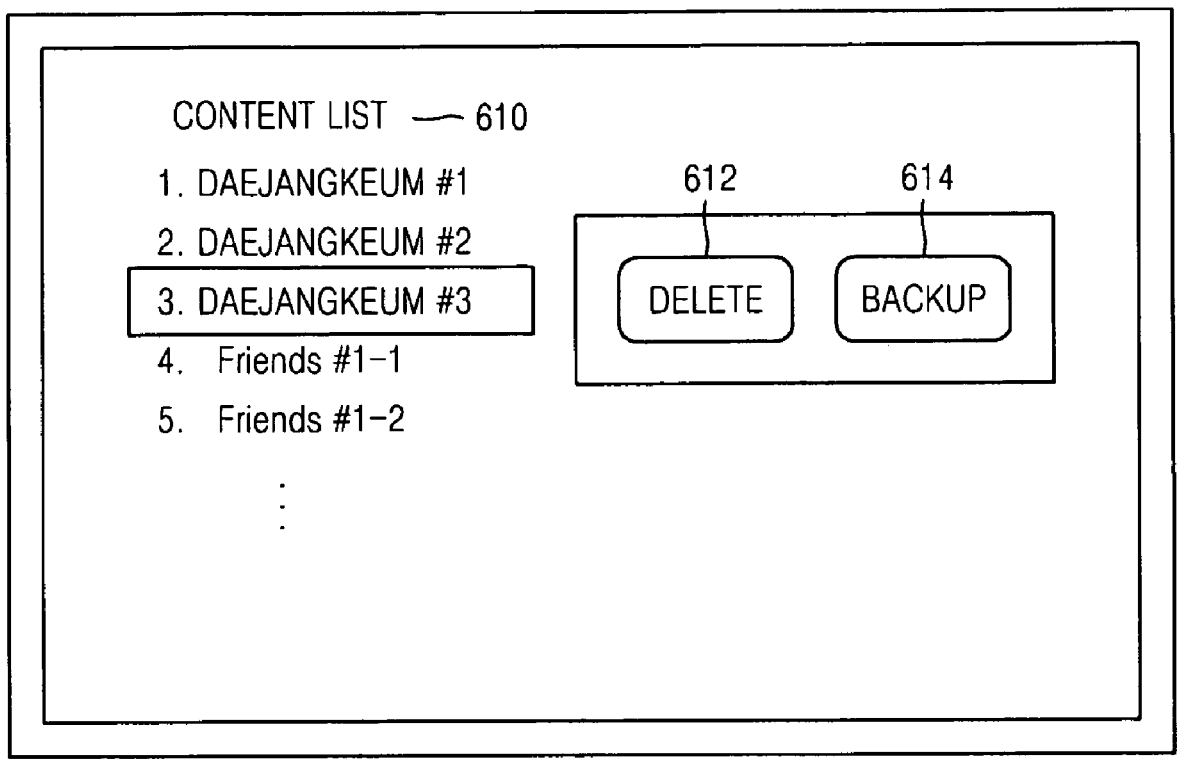
FIG. 6 illustrates a content Delete/Backup screen according to an exemplary embodiment of the present invention.

FIG. 6 illustrates a content Delete/Backup screen according to an exemplary embodiment of the present invention. A user can select a content item from a content list 610 and give a command to perform the deletion or backup of the selected content. If the content is not be used in the future, a Delete button 612 is clicked. If the content is to be used in the future, a Backup button 614 is clicked.

FIG. 7 is a flowchart of a method of deleting and backing up content according to an exemplary embodiment of the present invention. The flowchart illustrated in FIG. 7 shows operations performed when a user clicks the Delete button 612 or the Backup button 614 on the interface screen illustrated in FIG. 6. When a user command is input through the user input unit 230 in operation 702, a command type is determined in operation 704. When the command type is determined to be a Backup command in operation 704, a file storing the content is deleted without deleting a content information file including location information or a license information file in operation 706. Accordingly, if the user wants to use the content afterwards, the content can be restored.

When the command type is determined to be a Delete command in operation 704, all of the file storing the content and a file storing the location information are deleted in operation 708. In operation 708, the license information file may also be deleted.

FIGS. 8A and 8B illustrate screens for providing a content list according to an exemplary embodiment of the present invention. A content list and a backup content list are provided on separate interfaces, respectively. A user can view only a list of backup content by requesting only a backup content list. In this case, a special input such as a key on a remote control or a selection option for requesting the backup content list is provided.

FIG. 8C illustrates a content list screen according to another exemplary embodiment of the present invention. A content list and a backup content list are provided on one screen. On the screen, content stored in the storage unit 220 may be expressed distinctively from backup content. Referring to FIG. 8C, "backup" 810 is used to distinguish backup content from content actually stored in the storage unit 220. However, a method of distinguishing backup content from stored content is not restricted to the above method. For example but not by way of limitation, a backup content item may be colored differently or highlighted.

Figure 9:
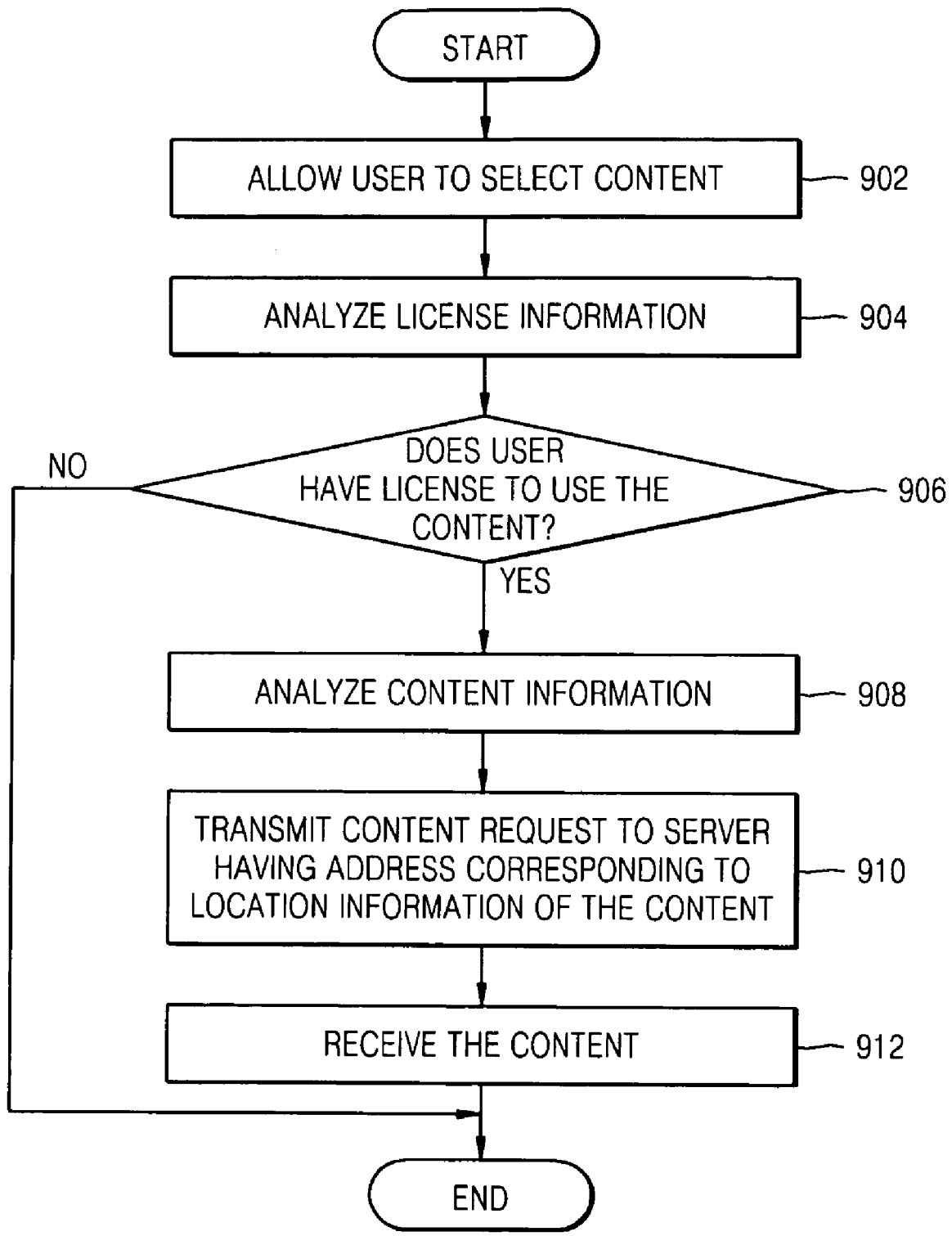
FIG. 9 is a flowchart of a method of restoring backup content according to an exemplary embodiment of the present invention.

FIG. 9 is a flowchart of a method of restoring backup content according to an exemplary embodiment of the present invention. In operation 902, a user selects backup content to be restored from a content list. When the content has related license information, license information of the content is analyzed in operation 904. In operation 906, it is determined whether the user has a license to use or restore the content based on the analyzed license information. If it is determined that the user has a license in operation 906, content information is analyzed and information about the location of a server providing the content is extracted in operation 908. Content request information is generated and transmitted to the server corresponding to the location information in operation 910. The content is received from the server in operation 912. If it is determined that the user does not have a license in operation 906, the method ends. If the method ends, information about re-purchase of the license, or the like, may be provided to the user. Alternatively, after the content is received from the server, access to the content may be controlled based on the license.

The exemplary embodiments can include computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). However, the exemplary embodiments are not limited thereto. The computer readable recording medium can also be distributed over network coupled computer systems so that the computer readable code is stored and executed in a distributed fashion.

As described above, since information about a location of a server providing content is stored when the content is stored, storage space may be efficiently used when the content is stored, deleted, backed up, and restored.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of managing content, the method comprising:
   when the content is downloaded from a server to a client device for a first time, automatically generating content information including location information about a location of the server from which the content is downloadable;
   storing the content and the content information as a content file and a content information file, respectively, on the client device when the content is downloaded from the server for the first time;
   in subsequent operations, determining whether the content is stored in the client device;
   accessing the content from the client device, if it is determined that the content is stored in the client device; and
   downloading the content from the server using the location information in the stored content information file, if it is determined that the content is not stored in the client device.

2. The method of claim 1, wherein the location information comprises uniform resource locator (URL) information of the server.

3. The method of claim 1, further comprising receiving, from the server, license information for controlling a license to use the content and storing the license information.

4. The method of claim 3, wherein the generating and the storing of the content information comprises recording the content information in a file including the license information.

5. The method of claim 1, further comprising:
   receiving a backup command;
   deleting the content file from the client device in response to the receiving the backup command; and
   maintaining, on the client device, the content information file, which has been stored when the content was downloaded from the server for the first time.

6. An apparatus for managing content, the apparatus comprising:
   a transceiver that transmits information to and receives information from a server;
   a content information generator that automatically generates content information, including information about a location from which the content is downloadable, when the content is downloaded from the server for a first time; and
   a file manager that transmits content request information to the server through the transceiver, receives the content from the server, stores the content and the content information as a content file and a content information file, respectively, in a storage unit of a client device when the content is downloaded from the server for the first time, and subsequently accesses the content using the location information in the stored content information, wherein, prior to subsequently accessing the content, the file manager determines whether the content is stored in the storage unit, accesses the content from the storage unit, if it is determined that the content is stored in the storage unit, and downloads the content from the server using the location information stored in the storage unit, if it is determined the content is not stored in the storage unit.

7. The apparatus of claim 6, wherein the file manager receives a backup command, deletes the content file from the client device in response to receiving the backup command, and maintains, on the client device, the content information file, which has been stored when the content was downloaded from the server for the first time.

* * * * *